Oct. 9, 1956 E. S. DAVIS 2,766,381

MARKER SIGNAL GENERATOR

Filed Oct. 29, 1954 2 Sheets-Sheet 1

MARKER SIGNAL AMPLIFIER VISUAL BEAT INDICATOR

300KC SELF EXCITED OSCILLATOR

400∿ FEED BACK OSCILLATOR

ERWIN STUART DAVIS
INVENTOR.

BY Rudolph J. Juick
ATTORNEY

ERWIN STUART DAVIS
INVENTOR.

BY Rudolph J. Juick
ATTORNEY 2,766,381
Patented Oct. 9, 1956

2,766,381

MARKER SIGNAL GENERATOR

Erwin Stuart Davis, Newark, N. J., assignor to Weston Electrical Instrument Corporation, Newark, N. J., a corporation of New Jersey Application October 29, 1954, Serial No. 465,623

1 Claim. (Cl. 250—36)

This invention relates to a marker signal generator useful for the visual alignment of a television receiver and more particularly to a novel circuit arrangement whereby a single electron tube output stage serves to provide the various different output signals of the generator.

In the co-pending United States patent application Serial No. 457,014, filed September 20, 1954, in the names of R. C. Langford and F. W. Sippach, Jr., and entitled Method and Apparatus for Testing Electronic Circuits and Components, there is disclosed a novel arrangement whereby the complete response curve of a TV receiver may be obtained even when the response of the receiver is zero to a marker signal of a given frequency. Briefly, this result is obtained by mixing a frequency modulated sweep generator signal with that of a variable frequency oscillator and applying the resultant beat signals (after due demodulation, amplification and clamping to ground level) to the oscilloscope element that controls the intensity of the electron beam.

In co-pending United States patent application, Serial No. 462,928, filed October 18, 1954, in the names of R. C. Langford and E. S. Davis, and entitled Marker Signal Generator, there is disclosed and claimed a marker signal generator incorporating a simple and positive arrangement for the visual indication of the true zero beat point between two input signals applied to a mixer circuit.

The present invention is concerned with a novel circuit comprising part of a marker signal generator of the type disclosed by the above-referenced co-pending applications, said novel circuit reducing substantially the number of required components thereby promoting economy of manufacture and long trouble-free operating life.

An object of this invention is the provision of an electronic circuit including only a single multi-grid vacuum tube for providing a plurality of output signals of different character and as required in a marker signal generator.

An object of this invention is the provision of a signal generator including an amplifier, circuit components adapted to be connected to the output stage of the amplifier and a manually-operable switching arrangement whereby selected components are connected to a single multi-grid tube in the amplifier output stage thereby to provide output signals of a predetermined character.

An object of this invention is the provision of an improved marker signal generator of the class comprising a mixer circuit capable of producing signals having a frequency that is equal to the difference frequency between two input signals, a demodulator and amplifier and a clamping circuit, the improvement residing in the provision of a single multi-grid vacuum tube in the amplifier output stage, circuit components, and switch means operable to connect selected circuit components into operative relation with the vacuum tube thereby to cause the output stage of the amplifier to function selectively as an amplifier of the mixer circuit output signals, a self-excited oscillator for the generation of horizontal bar signals and a self-excited oscillator for the generation of vertical bar signals.

These and other objects and advantages will become apparent from the following description when taken with the accompanying drawings. It will be understood the drawings are for purposes of illustration and are not to be construed as defining the scope or limits of the invention, reference being had for the latter purpose to the appended claim.

In the drawings wherein like reference characters denote like parts in the several views.

Figure 1:
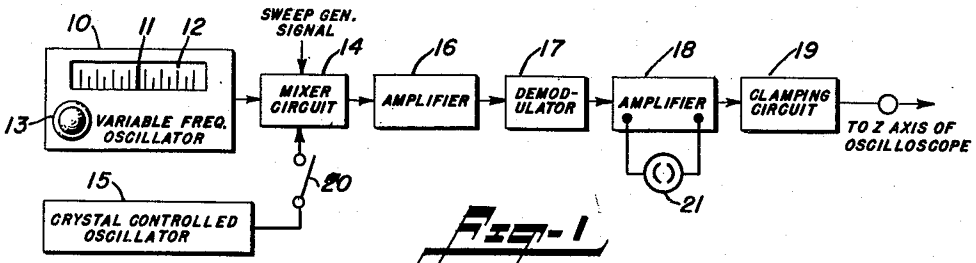
Figure 1 is a block diagram showing the various major components of a marker signal generator of the type to which this invention is directed.

Reference is now made to Figure 1 which is a block diagram showing the major components of a calibrator or marker signal generator of the type to which this invention is directed. The variable frequency oscillator 10 includes a pointer 11 movable over a scale 12, calibrated in frequency values, in response to rotation of a knob 13. Rotation of the knob 13 alters the constants of the oscillator tank circuit in any of several specific ways well known in the art. The signal of the oscillator 10 is injected into a mixer circuit 14 along with an accompanying signal from a sweep generator, the latter being frequency modulated at a 60 cycle rate. If the plate load in the mixer circuit is tuned to 75 kilocycles there will be two points at which the mixer circuit will generate an output. One such point will be 75 kilocycles below and the other 75 kilocycles above the frequency of the variable frequency oscillator. These 75 kilocycle signals are amplified by the amplifier 16 and rectified by the demodulator 17. Such rectified signals are further amplified by the amplifier 18 and clamped to ground level by the clamping circuit 19. If the signal of a crystal controlled oscillator 15 is also impressed on the mixer circuit, by closure of the switch 20, its signals will produce side bands on the variable frequency oscillator signal. For example, if the variable frequency oscillator is set to 100 megacycles and the crystal oscillator to 4.5 megacycles, then three marker signals at 95, 5, 100 and 104.5 megacycles will also be present in the mixer output. These various marker signals are applied to an oscilloscope to display on the oscilloscope screen the response curve of a television receiver as explained in detail in the above-referenced co-pending application, Serial No. 457,014.

In addition to the provision of marker signals, as just described, the apparatus should also include means for selectively producing 300 kilocycle signals for checking the vertical linearity of the TV receiver sweep circuits as well as 400 cycle signals for testing the horizontal linearity.

Still further, since even the best oscillator circuits are subject to minor scale errors some means should desirably be provided for periodically checking the scale of the variable frequency oscillator 10. This is best done by means of a self-contained crystal controlled oscillator whose signal is applied to the mixer circuit along with that of the variable frequency oscillator. These two oscillatory waves will combine to produce beat signals in the mixer output which signals are amplified, demodulated, etc. by the following circuitry. It is essential to be able to select the true zero beat point to the exclusion of spurious beats, hum noises, etc. which are inherent in any frequency modulated system passing through a zero beat. Since noise and spurious beat signals generally have a much lower amplitude than the desired fundamental, or true beat, signals it is possible to eliminate the effects thereof by connecting a gas tube 21 across the plate load coil of the amplifier 18. This particular, novel method of eliminating the effects of spurious signals to provide a visual indication only of the true beats is described and claimed in the above-referenced co-pending patent application, Serial No. 462,928, filed October 18, 1954. Suffice to say at this point that the gas tube has a minimum firing voltage and the amplitude of the signals applied to the tube electrodes is adjusted so that only the true beat signals will have an amplitude exceeding the level of the firing voltage. When the difference between the signals of the variable frequency oscillator and the crystal controlled oscillator becomes say, 1 kilocycle in the case where the two oscillator signal frequencies are in the megacycle range, the gas tube 21 will light up. Thus, if the frequency of the variable frequency oscillator is varied slowly up to and beyond the frequency of the crystal controlled oscillator the gas tube will light up, then become sharply extinguished and then light up again. It is, therefore, possible to set the frequency of the variable frequency oscillator to the exact frequency of the crystal controlled oscillator by simply noting when the glow of the gas tube is sharply extinguished. In such case, if the pointer of the variable frequency oscillator does not align with the scale mark corresponding to the frequency of the crystal oscillator, the entire scale is shifted to bring about such alignment, as by means disclosed in the co-pending patent application referred to immediately above.

There are, then, four main functions which are to be provided by a marker signal generator; namely, the provision of designated frequency marker signals, horizontal bar signals, vertical bar signals and visual means to facilitate the periodic standardizing of the variable frequency oscillator. The conventional method of providing such various output functions is by means of several vacuum tubes and individually associated components and circuitry. However, in accordance with this invention a single tetrode tube in the output stage of the amplifier 18, Figure 1, is arranged to perform all these functions thereby resulting in manufacturing economy, space saving and the promotion of simple trouble-free operation of the apparatus as a whole.

Figures 2, 3:
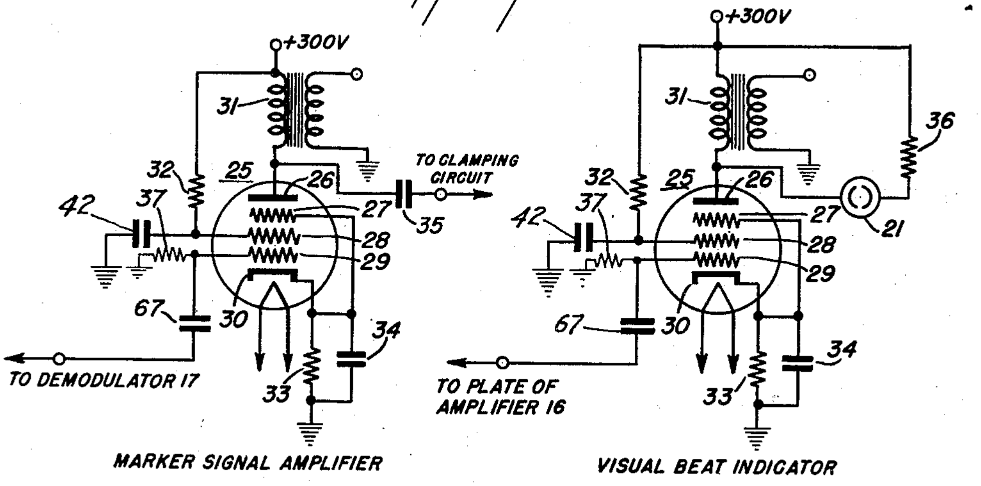
Figure 2 is a diagram showing the components and circuitry associated with a single multi-grid tube, here shown as a tetrode, when such tube is used as an amplifier for the marker signals to be applied to the Z-axis of the oscilloscope.
Figure 3 is a similar diagram showing a tetrode tube and circuitry as used in connection with a gas-filled tube to provide a visual indication of the true zero beat point between two signals applied to a mixer tube that forms part of a marker signal generator.

Reference is now made to Figure 2 which illustrates a tetrode vacuum tube 25, type 6CL6, having an anode 26, grids 27, 28, 29 and a cathode 30. This tube constitutes the amplifier designated by the numeral 18 in Figure 1. The anode load comprises the coil 31 which coil is shunted to the grid 28 through the grid resistor 32. The cathode 30 is grounded in the usual manner through the cathode resistor 33 shunted by the condenser 34, and the grid 27 is tied directly to the cathode. When so connected the tube acts as an amplifier stage for the marker signals applied to its control grid 29, such marker signal appearing in the plate circuit of the preceding amplifier 16 (see Figure 1) and being rectified by the demodulator 17. These amplified signals are fed to the clamping circuit through the condenser 35.

Reference is now made to Figure 3 which, it will be noted, is exactly the same as Figure 2 with the exception that the gas filled tube 21 is here connected across the plate load coil 31 through the current limiting resistor 36. In this case, the marker signal output of the mixer is amplified and impressed upon the grid 29 of the tube 25 without prior demodulation. It may here also be pointed out that when the circuitry of the tube 25 is conditioned as shown in Figure 3, the plate coil in the mixer circuit is untuned and responds to low audio frequencies. The function of the gas tube is to provide a positive indication of the true zero beat point between the variable frequency oscillator and a crystal controlled oscillator used for checking the calibration of the variable frequency oscillator. The plate circuit of the tube 25 normally includes spurious beats and noises which obscure the true beats when conventional indicators are used such as loud speakers, meters, tuning eyes, etc. The gas tube 21, which may be a neon tube, requires a certain minimum firing voltage and it is only necessary to adjust the amplitude of the signals in the plate circuit of tube 25 so that all spurious beats and noise peaks have an amplitude below the firing level of the gas tube. Consequently, the gas tube 21 will light up only in response to the true beat signals. When the difference frequency between the variable oscillator and crystal oscillator is very small the gas tube lights up and the exact zero beat point is indicated when the gas tube is sharply extinguished. It will be apparent that the gas tube can be given an A.-C. or D.-C. bias potential, when required, to permit selection of signal amplitude differences of small magnitude.

It may here also be pointed out that the Figure 3 circuit is also employed when the marker signal generator is conditioned to measure an unknown signal frequency. In such case the unknown signal is impressed on the mixer circuit along with the signal from the variable frequency oscillator and the unknown frequency is read from the calibrated dial of the variable frequency oscillator when the gas tube 21 is sharply extinguished.

Figure 4:
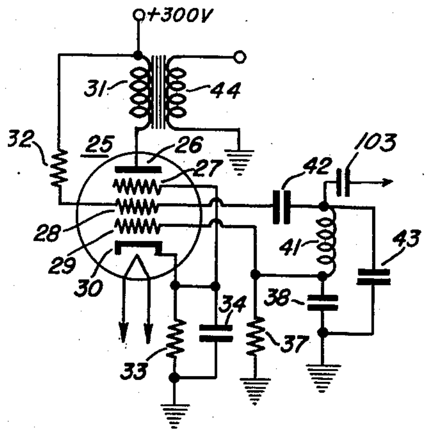
Figure 4 is a diagram showing the tetrode tube circuit modified to form a self-excited 300 kilocycle oscillator for horizontal bar generation.

Figure 4 illustrates the circuitry associated with the tetrode tube 25 when used as a 300 kilocycle self-excited oscillator. When connected in this manner the tube functions as a Colpits oscillator. Here the control grid 29 is grounded through the resistor 37 and condenser 38. The grid 28 remains connected to the 300 volt energizing source through the resistor 32 and the coil 41, tuned to 300 kilocycles by the condensers 42, 43 and 38, is connected across the grids 28 and 29. The resulting 300 kilocycle oscillations in the plate coil 31 are supplied to a subsequent amplifier from the coil 44 that is coupled to the coil 31.

Figure 5:
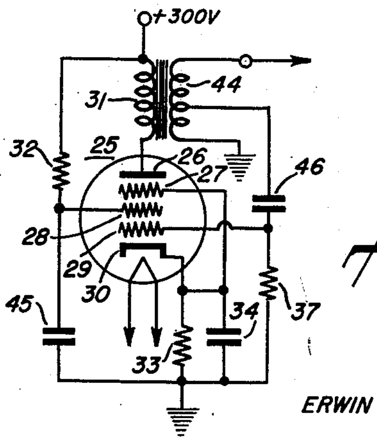
Figure 5 is a diagram showing the tetrode circuit modified to form a self-excited 400 cycle oscillator for vertical bar generation.

Figure 5 illustrates the circuitry associated with the tetrode tube 25 when used as a 400 cycle self-excited oscillator. The grid 28 is now also grounded through the condenser 45 and the control grid 29 is coupled to the center of the coil 44 through the condenser 46. When connected in this manner the tube functions as a feedback oscillator.

Having now illustrated and described the circuitry and components associated with the tube 25 to provide the four separate functions to be included in a practical marker signal generator a practical circuit diagram, including the associated switching mechanism will now be described.

Figure 6:
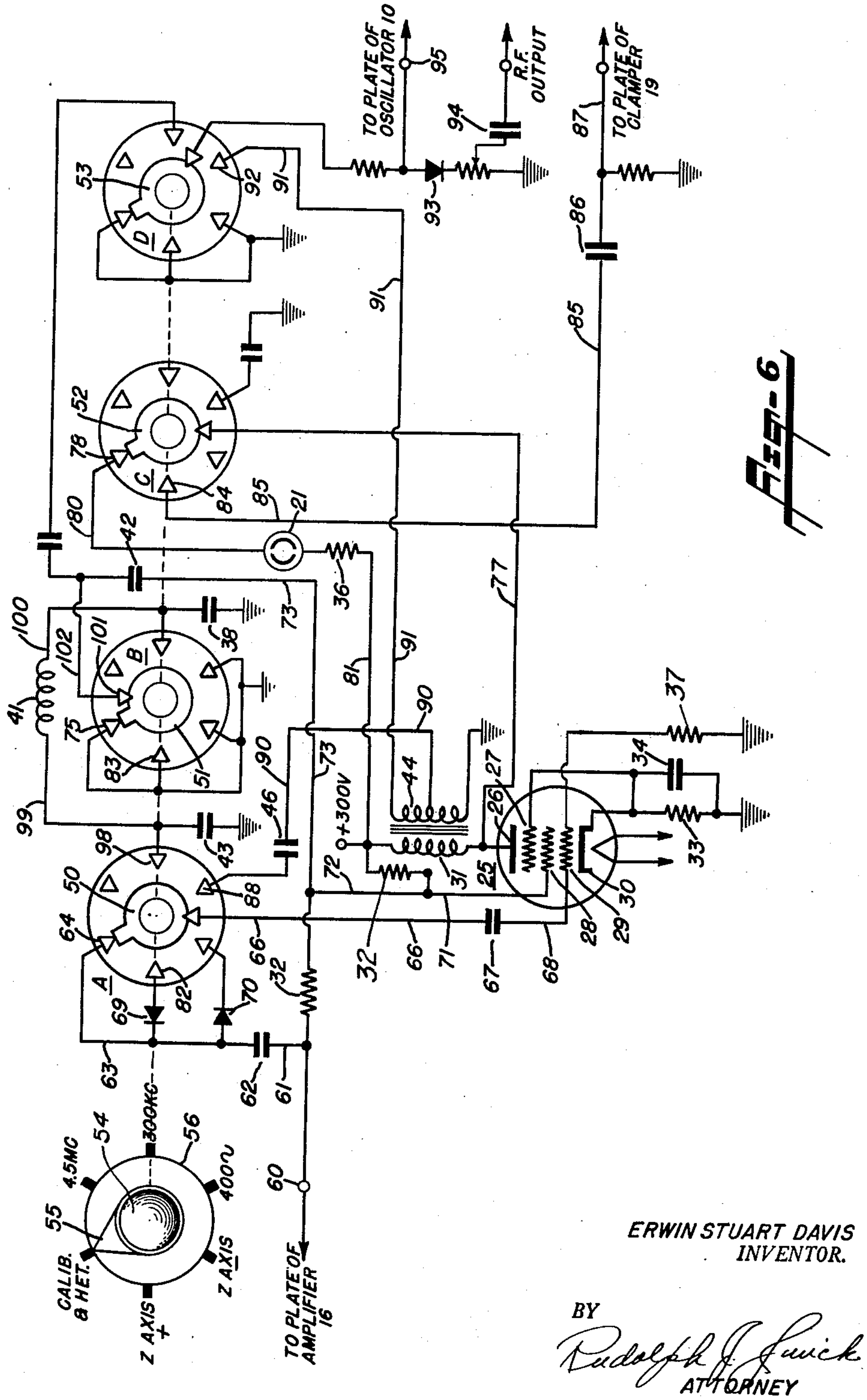
Figure 6 is a wiring diagram of the combined circuits of Figures 2–5, inclusive, and including a switching arrangement for obtaining a desired functioning of the single tetrode tube and the associated circuitry.

Reference is now made to Figure 6. The multifunctions of the single tetrode 25 (as individually illustrated in Figures 2–5, inclusive) are selectively controlled by a suitable switching arrangement. The switch comprises the four decks A, B, C and D, each provided with a plurality spaced stationary contact, and the rotary contacts 50–53, respectively. These rotary contacts are secured to but electrically insulated from a single shaft carrying the operating knob 54 and the index pointer 55, the latter cooperating with a fixed dial 56 carrying legends as indicated. The switch is shown in the Calib. and Het. position which indicates that the circuitry is conditioned for either checking the calibration of the variable frequency oscillator or for determining the frequency of an unknown signal. In the former case the mixer output comprises the beat signals of the variable frequency oscillator and the crystal oscillator. These appear at the terminal 60 which is connected to the plate circuit of the first amplifier 16 (see Figure 1). These beat signals are applied directly to the control grid 29 of the tetrode 25 through the lead 61, condenser 62, lead 63, closed contacts 50, 64 of the switch deck A, lead 66, condenser 67 and lead 68. It will be noted that the rectifiers 69 and 70 (forming the demodulator 17 of Figure 1) are not connected into the circuit with the indicated setting of the multi-deck selector switch. It will also be noted that the grid 27 is conneced to ground, the circuit comprising the leads 71, 72, 73, condenser 42, the closed contacts 51, 75 of the switch deck B. The gas tube 21 is connected across the plate coil 31, through the switch deck C, the circuit comprising the lead 77, closed contacts 52, 78 of the deck C, lead 80, gas tube 21, current limiting resistor 36 and lead 81. It, therefore, is apparent that the circuitry of the tetrode tube 25 is identical to that shown in Figure 3 when the selector switch is set as just described and as shown in Figure 6. The gas tube, then, is energized by the voltages appearing across the plate coil 31. These voltages comprise the beat signals together with numerous spurious beat signals and noises. If, now, the amplitude of the signals appearing in the plate coil 31 is adjusted so that the amplitude of the true beat signals is, say, 65 volts, and if the gas tube has a minimum firing voltage of 60 volts, then the gas tube will glow only in response to the true beat signals. In other words, by proper adjustment of the amplitude of the true beat signals with respect to the firing voltage of the gas tube the spurious beat signals and noises (which have a substantially lower amplitude) do not produce a glow in the gas tube. Thus, the gas tube serves as a visual indicator for positive identification of the true beat signals. When the difference frequency between the variable frequency oscillator and the crystal oscillator becomes some predetermined, small value, the gas tube 21 will light up and the exact zero beat point can be determined when the glow of the tube is sharply extinguished. Consequently, the precise calibration of the variable frequency oscillator scale can be checked and suitable corrective action be applied, if necessary.

If it is desired to check the frequency of an unknown signal, rather than check the calibration of the variable frequency oscillator, the unknown signal is applied to the mixer circuit in place of the crystal oscillator signal. The frequency of the unknown signal is read from the calibrated dial of the variable frequency oscillator when the zero beat point is established by means of the gas tube 21.

It will now be assumed that the selector switch is set to the position "Z-axis (+)." In this case the signals appearing in the mixer output circuit comprise marker envelopes of a predetermined frequency, as established by the frequency of the variable frequency oscillator beating with the sweep generator signal and/or side band markers as determined by the crystal oscillator frequency. These marker signal envelopes appear at the terminal 60. Now, however, such signals are applied to the control grid of the tetrode 25 through the rectifier 69, the circuit being traceable through the lead 61, condenser 62, rectifier 69, now-closed contacts 50, 82 of the switch deck A, lead 66, condenser 67 and lead 68. It will be noted that the grid 28 remains grounded through the now-closed contacts 51, 83 of the switch deck B and that the gas tube 21 is removed from the circuit by the now-open contacts 52, 78 of the switch deck C. However, the signal appearing in the plate circuit of the tube is now applied to the clamper circuit, the circuit being traceable through the lead 77, closed contacts 52, 84 of switch deck C, lead 85, condenser 86 and lead 87. The marker signals, therefore, are amplified by the tube 25, clamped by the clamper circuit 19 (see also Figure 1) and applied to the Z-axis of the oscilloscope. It will be apparent that the just-described circuit, that is, with the selector switch set to the Z-axis (+) position, corresponds to that shown in Figure 2.

When the selector switch is set to the Z-axis (−) position the functioning of the tube 25 essentially is the same as that described immediately above except that the reversely-disposed rectifier 70 is used whereby the polarity of the marker signals applied to the Z-axis of the oscilloscope is reversed.

When the selector switch is set to the position "400," the circuitry associated with the tube 25 is conditioned to cause the tube as a self-excited 400 cycle oscillator. Now the control grid 29 is connected to the center tap of the secondary winding 44 of the output transformer forming the plate load, the circuit being traceable through the lead 68, condenser 67, lead 66, now-closed contacts 50, 88 (of the switch deck A), condenser 46 and lead 90. One end of the secondary winding is grounded and the other end is connected to the stationary contact 92, of the switch deck D, by the lead 91. Since the deck D contacts 53 and 92 are now closed, the signal output of the tube 25 is applied to the terminal 95 through the rectifier 93 and condenser 94 to provide a 400 cycle modulation signal available to produce horizontal bars on the TV set for checking vertical linearity. It will now be apparent that when the selector switch is set to the "400" position the circuitry and components operatively associated with the tube 25 are identical to those shown in the schematic circuit of Figure 5.

When the selector switch is set to the position "300 Kc.," the tube is operated as a self-excited, 300 kilocycle oscillator. The grid 29 of the tube 25 is connected to the grid 28 through a coil 41, the circuit being traced as follows: lead 68, condenser 67, lead 66, now-closed contacts 50 and 98 (of switch deck A), lead 99, coil 41, lead 100, now-closed contacts 51 and 101 (of switch deck B), lead 102, condenser 42 and leads 73, 72 and 71. It will be noted that in this circuit the condensers 38 and 43 individually are connected between the ends of the coil 41 and ground, just as in the schematic diagram of Figure 4, and that the grid 28 remains connected to the plate load coil 31. The tube 25, therefore, functions as a conventional feedback oscillator with an oscillation frequency determined by the constants of the grid coupling coil 41 and condenser 42. In the present case, this oscillation frequency is set to 300 kilocycles for checking the vertical linearity of a TV receiver.

Having now described my invention it is apparent that I provide a single multi-grid vacuum tube which, through an associated switching arrangement of leads and components, serves numerous functions required in a practical marker signal generator adapted for testing a television receiver. The advantages of such novel arrangement over prior arrangements which include separate tubes for providing the individual functions are apparent.

In view of the description here given various changes and modifications will suggest themselves to those skilled in this art and it is intended that such changes and modifications shall fall within the spirit and scope of the invention as recited in the following claim.

I claim:

In an electronic circuit adapted to function as an audio frequency feedback oscillator, a high frequency self-excited oscillator and a signal amplifier, the improvement comprising a single electron tube having an anode, a cathode and first, second and third grids; leads connecting the said cathode to ground through a cathode resistor shunted by a first capacitor; a lead connecting the said third grid to the cathode; a transformer having a primary winding and a secondary winding; leads connecting the transformer primary winding between the said anode and the positive side of a voltage source, the negative side of the voltage source being connected to ground; a lead connecting the said second grid to the positive side of the said voltage source through a voltage-dropping resistor; a tuned circuit comprising an inductance coil connected in series with a second capacitor and a third capacitor shunted across both the inductance coil and second capacitor; a multi-deck switch manually operable to one of four positions; circuit elements, effective when the said switch is moved to a first position, connecting the said first grid to a tap on the transformer secondary winding through a fourth capacitor, and connecting the said second grid to ground through a fifth capacitor, whereby the electron tube and associated components operate as an audio frequency feedback oscillator; circuit elements, effective when the said switch is moved to a second position, connecting the said inductance coil between the first and second grids, and connecting the said tuned circuit between the said second grid and ground whereby the electron tube and associated components operate as a self-excited high frequency oscillator; circuit elements, effective when the said switch is moved to a third position, connecting the said second grid to ground through a sixth capacitor whereby the electron tube operates as an amplifier; and circuit elements, effective when the said switch is moved to a fourth position, connecting the said second grid to ground through the said sixth capacitor, and connecting a gas tube across the transformer primary winding.

References Cited in the file of this patent

UNITED STATES PATENTS

| | | |
|---|---|---|
| 2,121,434 | Klinedinst et al. | June 21, 1938 |
| 2,292,439 | Golicke | Aug. 11, 1942 |
| 2,393,856 | Collins | Jan. 29, 1946 |
| 2,491,244 | Becker | Dec. 13, 1949 |
| 2,533,032 | Montcalm | Dec. 5, 1950 |